United States Patent [19]

Küppers

[11] 4,314,833
[45] Feb. 9, 1982

[54] METHOD OF PRODUCING OPTICAL FIBERS

[75] Inventor: Dieter Küppers, Aachen, Fed. Rep. of Germany

[73] Assignee: U.S. Philips Corporation, New York, N.Y.

[21] Appl. No.: 169,348

[22] Filed: Jul. 16, 1980

[30] Foreign Application Priority Data

Jul. 19, 1979 [DE] Fed. Rep. of Germany ....... 2929166

[51] Int. Cl.$^3$ ............................................ C03B 37/075
[52] U.S. Cl. ...................................... 65/3.12; 427/39; 427/163
[58] Field of Search .................... 65/3.12; 427/39, 163, 427/237; 350/96.3

[56] References Cited

U.S. PATENT DOCUMENTS 4,145,456 3/1979 Küppers et al. .................. 427/39 X Primary Examiner—Richard V. Fisher
Attorney, Agent, or Firm—Marc D. Schechter

[57] ABSTRACT

Doped silica glass is deposited by means of reactive deposition from the gas phase by the action of a nonisothermal plasma, on the inside of a quartz glass tube. The coated tube is collapsed and the preform thus obtained is drawn into an optical fiber.

During the deposition procedure the tube inside diameter between 6 and 30 mm must satisfy the formula $$(M/A_I)\,1/3.58 \times 1\ mm \leq d$$

wherein M is the deposition rate of doped quartz glass in grams per minute and $A_I$ has the value $1.42 \times 10^{-4}$ g/min. At the end of the deposition, prior to collapsing, the inside diameter must satisfy the equation $$(M/A_{II})\,1/3.04 \times 1\ mm \geq d$$

$A_{II}$ having the value $6.63 \times 10^{-5}$ g/min.

8 Claims, 2 Drawing Figures

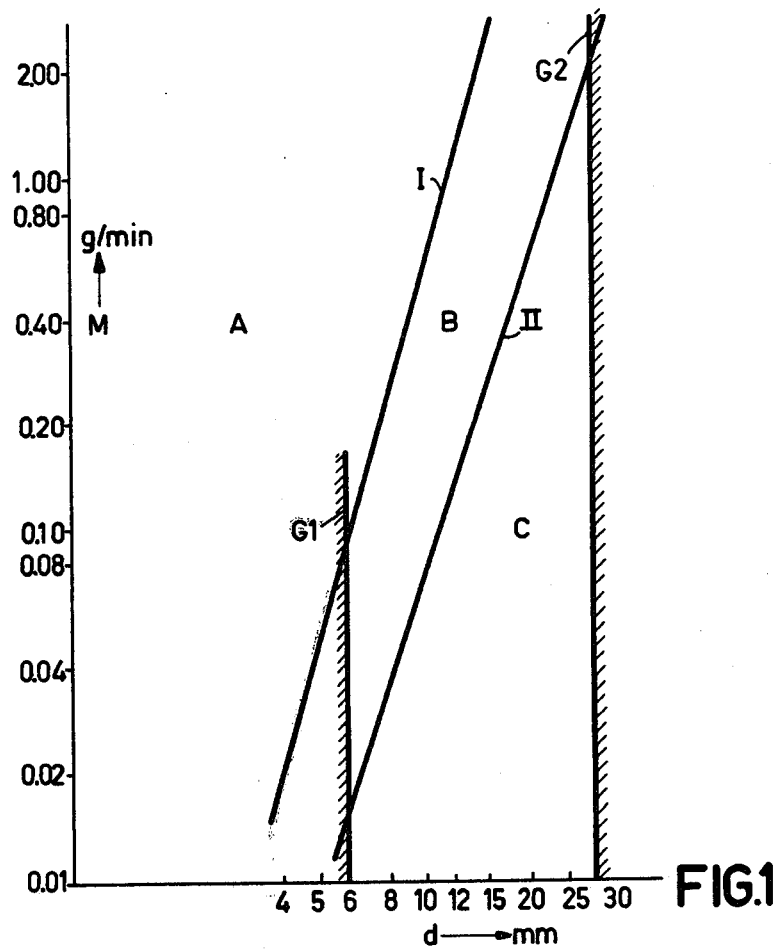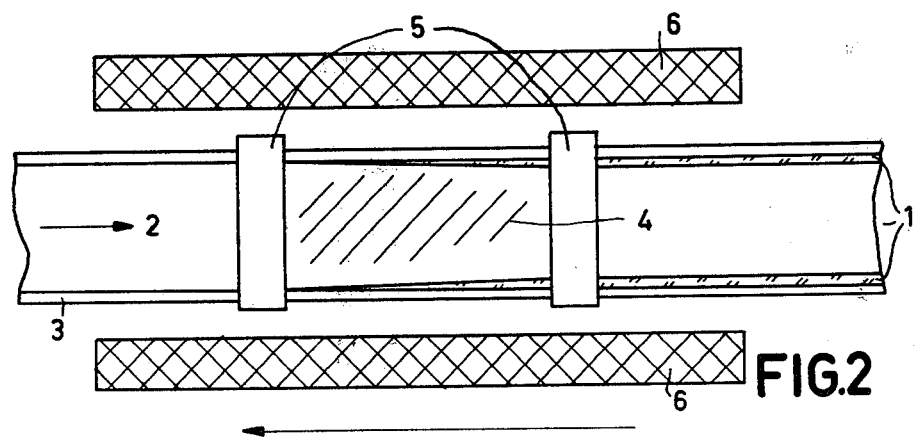

METHOD OF PRODUCING OPTICAL FIBERS

BACKGROUND OF THE INVENTION

The invention relates to a method of producing optical fibers in which silica glass, with or without a dipant, is deposited on the inside of a silica glas tube. The silicon glass is deposited directly from the gas phase by the reaction of a nonisothermal plasma. After deposition, the tube is collapsed and drawn into a fiber. The optical fibers produced by such a method may consist of a core of doped silica glass and a cladding of undoped silica glass. Alternatively, the fiber may consist of a core of either undoped or doped silica glass, a first cladding layer of doped silica glass, and an outer cladding of undoped silica glass. The dopant, depending on its type, may increase or decrease the refractive index of silica. Dopants such as $GeO_2$, $Al_2O_3$, and $TiO_2$ will increase the refractive index, while dopants such as $B_2O_3$, or F will decrease the refractive index. In an optical fiber the refractive index of the core material is higher than the layer of glass surrounding the core. There may be a sudden increase (stepped index) or a parabolic increase (graded index) of the core refractive index.

U.S. Pat. No. 4,145,456, which is hereby incorporated by reference, describes a method of producing internally coated glass tubes from which optical fibers can be drawn. This method uses a nonisothermal plasma at a pressure of approximately 1.3 to 130 millibars. In order to obtain good, strain-free layers, it is necessary to heat the glass tube to produce a high temperature zone superimposed on the plasma. In this method vitreous layers are formed directly from the gas phase. Glass particles are not usually formed.

During the experiments which resulted in the invention, it was found that in the above-mentioned plasma method fine glass particles may possibly be formed when the reaction conditions are changed. However, such particles are absolutely imcompatible with the method described in U.S. Pat. No. 4,145,456 and must therefore be avoided in all circumstances. It was found that in this method such particles cannot be melted down to vitreous layers without melting the tube. In particular, attempts to increase the deposition rate may result in the formation of the undesired glass particles.

It was also found that at a fixed, predetermined deposition rate the inside diameter of the tube must be as small as possible, at the end of the coating procedure, to achieve a geometrically perfect collapse.

SUMMARY OF THE INVENTION

It is an object of the invention to provide a method of producing optical fibers, by using a nonisothermal plasma, in which method the deposition rate is increased without producing interfering fine glass particles in the gas phase, and the inside diameter of the tube is as small as possible after the coating procedure in order to guarantee a trouble-free collapse.

According to the invention, this object is accomplished in that the deposition rate M is grams/minute is adjusted so that during deposition $$(M/A_I)1/3.58 \times mm \leq d,$$

where d is the inside diameter of the tube at the moment of deposition and $A_I$ has the value: $1.42 \times 10^{-4}$ g/min.

During the experiments which resulted in the invention it was found that this surprisingly simple relationship exists between the inside diameter of the tube during the coating procedure and the maximum deposition rate at which fine glass particles are not yet formed in the gas phase. The value for $A_I$ was determined experimentally.

It was further found that a geometrically perfect collapsing of the silica glass tube which was coated according to the invention , is always achieved when the deposition is continued for such a period of time that at the end of the deposition before the tube is collapsed, the inside diameter is given by $$(M/A_{II})1/3.04 \times 1 \text{ mm} \geq d,$$

where M is the deposition rate of silica glass and dopant in grams per minute, and $A_{II}$ has a value of $6.63 \times 10^{-5}$ g/min.

The invention will now be explained with reference to the accompanying drawing and some embodiments.

BRIEF DESCRIPTION OF THE DRAWING

FIG. 1 illustrates by means of a diagram the relationship between the deposition rate of silica glass and the tube inside diameter.

FIG. 2 is a schematic representation of a device for internally coating glass tubes.

DESCRIPTION OF THE PREFERRED EMBODIMENTS

In FIG. 1 the deposition rate M of silica glass, with or without dopant, is plotted in g/min versus the tube inside diameter d in accordance with the reaction equation

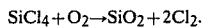

$$SiCl_4 + O_2 \rightarrow SiO_2 + 2Cl_2.$$

The dopant is also introduced as a halide. In FIG. 1 three regions are shown: regions A, B and C. It was found that for a given inside diameter of the tube the deposition rate must be kept below line I so that no fine glass particles are formed in the gas phase. In the upper region A, the formation of fine glass particles is very pronounced. As a result, in this region A the deposited material consists at least partially of fine glass particles, which must, however, be absolutely avoided in the plasma method.

The boundary line I is defined by $$d_I = (M/A_I)1/3.58 \times 1 \text{ mm}$$

wherein M is the deposition rate of core glass material in grams per minute, d is the inside diameter of the tube in mm, and $A_I = 1.42 \times 10^{-4}$ g/min.

A further important aspect of the invention takes into account the subsequent collapsing process The starting tube to be coated and the thickness of the layer to be deposited must be chosen so that the subsequent collapsing step does not cause any additional problems. Generally speaking, the inside diameter of the tube at the end of the deposition procedure prior to collapsing should be as small as possible. Every additional millimeter increases the risk of producing faults during the collapsing procedure. Such faults may include, for example, the production of an elliptical preform, a sagging preform or other geometrical faults. The shorter the collapsing step, the higher the degree of rotational symmetry which will be produced in the coated tube.

From the foregoing, it follows that the inside diameter of the tube to be collapsed must be as small as possible. The above equation for $d_I$, however, indicates a lower limit for the inside diameter at a given deposition rate. Experiments have proved that the region B satisfies all of these requirements to a very satisfactory extent. It must, however, be borne in mind that the tube inside diameter decreases during the coating procedure and that the final value must be below the line I. The line II is defined by the expression $$(M/A_{II})1/3.04 \times 1 \text{ mm} = d_{II}$$

wherein $A_{II} = 6.63 \times 10^{-5}$ g/min, M is again the deposition rate, for the above-mentioned expression and $d_{II}$ is the tube diameter.

FIG. 1 further shows the practical limits G1 and G2. Below a tube inside diameter of approximately 6 mm the obtainable deposition rates are so low that they become uneconomical. At an inside diameter of more than 30 mm it is very difficult to collapse the coated tube to form a solid, bubble-free, cylindrical preform. The equations mentioned above are then particularly important when, in order to shorten the collapsing step, the thickest possible layer is applied to the inside of the tube. Since the inside diameter of the tube decreases continuously, the deposition rate must be adapted correspondingly. One may start with a high deposition rate, which must however be continuously or stepwise reduced as the inside diameter decreases. If possible, one must always remain within the region B.

During the experiments which were conducted, the temperature of the substrate tube was in the range of approximately 1000° C. to 1200° C. Also, at high deposition rates almost 100% efficiency is obtained (i.e. the total quantity of $SiCl_4$ which is passed into the tube, together with the optional dopant in the form of a halide, is converted into $SiO_2$ and the oxide of the dopant). Therefore, the required and sufficient halide-gas flow ($SiCl_4$ + optional dopant in the form of a halide) can be determined in a simple manner for any desired deposition rate. The oxygen flow is determined by the fact that the overall pressure in the reaction zone is preferably in the range from 1 to 27 mbar and that the oxygen flow must be at least as large as the halide flow for stoichiometrical reasons. An oxygen flow which is three times, or more than three times, larger than the halide flow appeared to be advantageous. $GeCl_4$, $BCl_3$, $SiF_4$, $PCl_3$, for example, and other known dopants may be used in the process.

A plasma is necessary to activate the reaction, and when a greater number of molecules must be activated per unit of time it requires a higher power supply. If the microwave power in too low, opaque layers are produced. In practice, the required power is determined by means of a trial run during which the applied microwave power is increased until clear, transparent layers are deposited.

Special care must be taken to ensure that the applied microwave power is at least high enough to fill the interior of the tube with plasma. In addition, a rotationally-symmetric energy density is required in the tube to obtain a rotationally-symmetric deposition profile. When the above-mentioned requirements are satisfied, it appears that the deposited layers are of an optical fiber quality at any deposition rate according to the invention.

With an isothermal plasma, a hot plasma, the electron temperature is equal to the gas temperature. Both temperatures are typically on the order of magnitude of some tens of thousands of degrees. With a nonisthermal plasma, a cold plasma, such as used in the method according to the invention, the electron temperature is considerably higher than the gas temperature. The electron temperature typically has values of some 10,000 K, while the gas temperature increases typically, depending on the type of gas used and the pressure, not more than some 100 K.

In the following examples, tubes were coated by using the device shown in FIG. 2. FIG. 2 shows the deposition of $SiO_2$-glass 1 from a gas mixture $SiCl_4$ and $O_2$, and an optional dopant in the form of a halide, 2 on the inside of the wall of a fused silica tube 3. The gas mixture 2 is passed through the tube 3 in the direction indicated by the top arrow. A local nonisothermal plasma 4 is produced by ring electrodes 5 and is coupled either inductively or capacitively, or is produced in a microwave resonator. The bottom arrow in FIG. 2 indicates an axial relative motion between the tube 3 and the plasma-producing device. By means of a furnace 6, a temperature zone, which fully contains the plasma, is superimposed on the plasma 4.

EXAMPLE 1

A fused silica tube was coated on the inside with silica glass doped with $GeO_2$ and $B_2O_3$. A microwave resonator was used in which the microwave frequency was 2.45 GHz. The relative between the tube and the reaction zone was 3 m/min. The length of the reaction zone was 35 cm. The substrate temperature was 1050° C. and the total pressure was 13 mbar. The microwave power was 200 W. The fused silica tube used had an inside diameter of 6 mm and an outside diameter of 8 mm. The $SiCl_4$-flow was 30 cm$^3$/min (referred to standard conditions, temperature 0° C., pressure 1 bar $GeCl_4$-flow was increased linearly with time to the end of the deposition from 0 cm$^3$/min to 4 cm$^3$/min, the $O_2$-flow was 150 cm$^3$/min and the $BCl_3$-flow was 3 cm$^3$/min. The deposition rate was 0.08 g/min. This deposition rate was approximately at the critical limit. A further increase in the deposition rate resulted in fine glass particles being formed in the gas phase.

EXAMPLE 2

Compared to the Example 1 the following conditions were changed. The inside diameter was 8 mm, the outside diameter was 10 mm, the $SiCl_4$-flow was 60 cm$^3$/min, the $GeCl_4$-flow was increased from 0 to 7.5 cm$^3$/min, the $BCl_3$-flow was 5 cm$^3$/min and the toral pressure was 20 mbar. A deposition rate of 0.15 g/min was obtained.

EXAMPLE 3

500 W of microwave power was used. The fused silica used had an inside diameter of 11.5 mm and an outside diameter of 14 mm. At the start the $SiCl_4$-flow was 132 cm$^3$/min and was reduced to 116 cm$^3$/min until time $t_o$. The $BCl_3$-flow was first 21 cm$^3$/min and was gradually reduced to 7.5 cm$^3$/min. The $GeCl_4$-flow was increased linearly with time from O cm$^3$/min to the final value of 16 cm$^3$/min. The oxygen flow was 500 cm$^3$/min and was increased linearly with time to 595 cm$^3$/min. The average deposition rate was 0.3 g/min. The substrate temperature was 1050° C., the pressure in the reaction zone was 13 mbar.

EXAMPLE 4

The following changes were made compared with Example 3. The inside diameter was 16 mm, the outside diameter was 18 mm, the $SiCl_4$-flow was 177 cm³/min, the $GeCl_4$-flow was increased linearly with time from 0 cm³/min to 20 cm³/min, the $BCl_3$-flow was 10 cm³/min, the oxygen flow was 720 cm³/min. The deposition rate was 0.45 g/min at a total pressure in the tube of 25 mbar.

All tubes were collapsed after coating. To this end, a burner was moved several times along the coated quartz tube. This heated the tube locally to a temperature of approximately 2000° C., which is above the softening temperature. As a result, the tube shrinks in several stages to a rod (preform). From the preform thus obtained fibers were drawn which had a core of 47 μm and an outside diameter of 120 μm. For this purpose the preform was heated by means of a furnace or a ring burner to approximately 2000° C. Optical data was measured on fiber sections of 1 km long. At the measuring wavelength of 0.85 μm the optical losses of all fibers were beneath 5 dB/km and the pulse dispersions were less than 1.5 ns/km.

The described method can be used for both the deposition of doped and of undoped silica glass both for the production of monomode and multimode fibers. During the deposition of doped silica glass the dopant concentration can be kept constant during the deposition (stepped index fibers) or be increased or decreased (gradient fibers).

What is claimed is:

1. A method of producing optical fibers comprising the steps of:
   providing a silica glass tube;
   depositing a coating of silica glass, with or without a dopant, on the interior of the tube, said deposition being achieved by introducing a reactive gas mixture of glass-forming compounds into the tube and forming a nonisothermal plasma within the tube;
   collapsing the coated tube; and
   drawing the glass tube into a fiber;
   CHARACTERIZED IN THAT during the deposition step $$M/(A_I \times 3.58) \times 1 \text{ mm} \leq d,$$

where M is the instantaneous deposition rate in grams per minute, d is the inside diameter of the tube at the time of deposition and $A_I$ equals $1.42 \times 10^{-4}$ grams per minute.

2. A method as claim in claim 1, CHARACTERIZED IN THAT at the end of the deposition step $$M/(A_{II} \times 3.04) \times 1 \text{ mm} \geq d$$

where $A_{II}$ equals $6.63 \times 10^{-5}$/grams per minute.

3. A method as claimed in claim 2, CHARACTERIZED IN THAT 6 mm $\leq d \leq$ 30 mm.

4. A method of producing internally coated glass tubes by depositing a coating of glass layers on the interior to the tube, said method comprising the steps of:
   introducing a reactive gas mixture into the tube; and
   forming a nonisothermal plasma zone within a portion of the tube;
   CHARACTERIZED IN THAT the deposition rate, M, in grams per minute is less than or equal to the product of 5.0836 times $10^{-4}$ grams/minute-millimeter times the inside diameter of the tube, d, in millimeters at the time of deposition.

5. A method as claimed in claim 4, CHARACTERIZED IN THAT at the end of the deposition the deposition rate, M, in grams per minute is greater than or equal to the product of $2.01552 \times 10^{-4}$ grams/minute-millimeter times the inside diameter of the tube, d, in millimeters at the end of the deposition.

6. A method as claimed in claimed 5, CHARACTERIZED IN THAT the glass tube and the deposited layers comprise silica.

7. A method as claimed in claim 6, CHARACTERIZED IN THAT during deposition the tube is moved relative to the plasma zone.

8. A method of producing optical fibers comprising the steps of:
   producing an internally coated glass tube as claimed in claim 7;
   collapsing the coated glass tube; and
   drawing the collapsed tube into a fiber.

* * * * *

UNITED STATES PATENT AND TRADEMARK OFFICE
CERTIFICATE OF CORRECTION

PATENT NO. : 4,314,833
DATED : February 9, 1982
INVENTOR(S) : DIETER KUPPERS

It is certified that error appears in the above-identified patent and that said Letters Patent is hereby corrected as shown below:

Abstract, line 8, "$(M/A_I)1/3.58 \times 1mm \leq d$" should read

--$(M/A_I)^{\frac{1}{3.58}} \times 1mm \leq d$--

Abstract, line 13, and column 2, line 13, "$(M/A_{II})1/3.04 \times 1mm \geq d$" should read --$(M/A_{II})^{\frac{1}{3.04}} \times 1mm \geq d$--

Column 1, line 63, "$(M/A_i)1/3.58 \times mm \leq d$" should read

--$(M/A_I)^{\frac{1}{3.58}} \times 1mm \leq d$--

Column 2, line 49, "$d_I = (M/A_I)1/3.58 \times 1mm$" should read

--$d_I = (M/A_I)^{\frac{1}{3.58}} \times 1mm$--

Column 3, line 12, "$(M/A_{II})1/3.04 \times 1mm = d_{II}$" should read

--$(M/A_{II})^{\frac{1}{3.04}} \times 1mm = d_{II}$--

UNITED STATES PATENT AND TRADEMARK OFFICE
CERTIFICATE OF CORRECTION

PATENT NO. : 4,314,833
DATED : February 9, 1982
INVENTOR(S) : DIETER KUPPERS

It is certified that error appears in the above-identified patent and that said Letters Patent is hereby corrected as shown below:

Claim 1, line 13 (column 6, line 1), "M/($A_I$x3.58)x1mm≤d"

should read -- $(M/A_I)^{\frac{1}{3.58}} \times 1mm \leq d$ --

Claim 2, line 3 (column 6, line 11) "M/($A_{II}$x3.04)x1mm≥d"

should read -- $(M/A_{II})^{\frac{1}{3.04}} \times 1mm \geq d$ --

Claim 4, lines 7-11 (column 6, lines 21-25)

"the deposition rate, M, in grams per minute is less than or equal to the product of 5.0836 times $10^{-4}$ grams/minute-millimeter times the inside diameter of the tube, d, in millimeters at the time of deposition."

should read -- $(M/A_I)^{\frac{1}{3.58}} \times 1mm \leq d$ where M is the deposition rate in grams per minute, d is the inside diameter of the tube in millimeters at the time of deposition, and $A_I$ equals 1.42 x $10^{-4}$ grams per minute.--

UNITED STATES PATENT AND TRADEMARK OFFICE
CERTIFICATE OF CORRECTION

PATENT NO. : 4,314,833
DATED : February 9, 1982
INVENTOR(S) : DIETER KUPPERS

It is certified that error appears in the above-identified patent and that said Letters Patent is hereby corrected as shown below:

Claim 5, line 2-6 (column 6, lines 28-32)

"the deposition rate, M, in grams per minute is greater than or equal to the product of $2.01522 \times 10^{-4}$ grams/minute-millimeter times the inside diameter of the tube, d, in millimeters at the end of the deposition."

should read -- $(M/A_{II})^{\frac{1}{3.04}} \times 1mm \geq d$ where $A_{II}$ equals $6.63 \times 10^{-5}$ grams per minute. --.

Signed and Sealed this

Twenty-eighth Day of October, 1986

[SEAL]

Attest:

DONALD J. QUIGG

Attesting Officer

Commissioner of Patents and Trademarks